United States Patent [19]

Fuller

[11] Patent Number: 5,341,381
[45] Date of Patent: Aug. 23, 1994

[54] REDUNDANT ARRAY PARITY CACHING SYSTEM

[75] Inventor: William T. Fuller, San Jose, Calif.

[73] Assignee: Tandem Computers, Incorporated, Cupertino, Calif.

[21] Appl. No.: 823,141

[22] Filed: Jan. 21, 1992

[51] Int. Cl.$^5$ .............................................. G06F 11/20
[52] U.S. Cl. ................................. 371/10.1; 371/11.1
[58] Field of Search .................... 371/10.1, 11.1, 51.1, 371/40.1; 395/575

[56] References Cited

U.S. PATENT DOCUMENTS

| | | | |
|---|---|---|---|
| 3,894,178 | 7/1975 | Sordello | 360/73 |
| 4,092,732 | 5/1978 | Ouchi | 364/900 |
| 4,467,421 | 8/1984 | White | 364/200 |
| 4,562,576 | 12/1985 | Ratcliffe | 371/21 |
| 4,667,326 | 5/1987 | Young et al. | 371/40 |
| 4,722,085 | 1/1988 | Flora et al. | 371/38 |
| 4,754,397 | 6/1988 | Varaiya et al. | 364/200 |
| 4,761,785 | 8/1988 | Clark et al. | 371/51 |
| 4,768,193 | 8/1988 | Takemae | 371/10 |
| 4,775,978 | 10/1988 | Hartness | 371/38 |
| 4,817,035 | 3/1989 | Timsit | 364/900 |
| 4,849,929 | 3/1989 | Timsit | 364/900 |
| 4,870,643 | 9/1989 | Bultman et al. | 371/11.1 |
| 4,899,342 | 2/1990 | Potter et al. | 371/10.1 |
| 4,914,656 | 4/1990 | Dunphy, Jr. et al. | 371/10.2 |
| 4,989,206 | 1/1991 | Dunphy, Jr. et al. | 371/10.1 |
| 4,993,030 | 2/1991 | Krakauer et al. | 371/40.1 |
| 5,088,081 | 2/1992 | Farr | 369/54 |
| 5,124,987 | 6/1992 | Milligan et al. | 371/10.1 |
| 5,130,992 | 7/1992 | Frey, Jr. et al. | 371/40.1 |
| 5,134,619 | 7/1992 | Hensen et al. | 371/40.1 |
| 5,208,813 | 5/1993 | Stallmo | 371/10.1 |
| 5,257,391 | 10/1993 | DuLac et al. | 395/80 |
| 5,265,098 | 11/1993 | Mattson et al. | 371/11.1 |
| 5,271,012 | 12/1993 | Blaum et al. | 371/10.1 |

OTHER PUBLICATIONS

Patterson, D. A., Gibson, G., and Katz, H.; A Case For Redundant Arrays of Inexpensive Disks (RAID).
Lee, E. K.; Software and Performance Issues in the Implementation of a RAID Prototype (May 1990).
Chen, P., Gibson, G., Katz, R. H., Patterson, D. A., and Schulze, M.; Introduction to Redundant Arrays of Inexpensive Disks (RAID) (Dec. 1988).
Chen, P., Gibson, G., Katz, R. H., Patterson, D. A., and Schulze, M., et al. Evolution of the Raid 2 Architecture (Jun. 12, 1990).
Maximum Strategy, Inc., San Jose, Calif.; Strategy 2 Disk Array Controller Operation Manual (Nov. 2, 1988).
Maximum Strategy, Inc., San Jose, Calif.; Strategy 1 Disk Array Controller Operation Manual (Date unknown).
Gibson, G. A., Performance and Reliability in Redundant Arrays of Inexpensive Disks (Date Unknown).
Chen, P., An Evaluation of Redundant Arrays of Disks Using an Amdahl 5890; (May 1989).
Katz, R. H., Gibson, G. A., and Patterson, D. A., Disk System Architectures for High Performance Computing (Mar. 1989).
Gray, J., Horst, B., and Walker, M.; Parity Striping of Disc Arrays: Low-Cost Reliable Storage with Acceptable Throughput (Jan. 1990).
Schultz, M. E.; Considerations in the Design of a Raid Prototype (Aug. 1988).
Clark, and Corrigan; IBM Systems Journal, vol. 23, No. 3, 1989.

*Primary Examiner*—Charles E. Atkinson
*Attorney, Agent, or Firm*—Graham & James

[57] ABSTRACT

An apparatus and method for improving the input/output performance of a redundant storage array system. The present invention provides a "special parity" cache within the controller for a redundant storage array system, and means for determining and caching a quantity known as the "remaining redundancy row parity" (RRR-parity) block. The RRR-parity block is equal to the old parity block of a redundancy row XOR'd with an old data block being read from the same redundancy row. By caching RRR-parity blocks, Write-intensive storage unit operations can be reduced by up to three input/output accesses.

28 Claims, 4 Drawing Sheets

REDUNDANT ARRAY PARITY CACHING SYSTEM

BACKGROUND OF THE INVENTION

1. Field of the Invention

This invention relates to computer system data storage, and more particularly to an apparatus and method for improving the input/output performance of a redundant storage array system.

2. Description of Related Art

A typical data processing system generally includes one or more storage units connected to at least one central processor unit (CPU). The function of the storage units is to store data and programs which the CPU uses in performing particular data processing tasks. Various types of storage units are used in current computer systems. A typical computer system may include one or more large capacity tape units and/or disk drives (magnetic, optical, or semiconductor).

More recently, highly reliable disk array data storage systems have been introduced to the market. A research group at the University of California, Berkeley, in a paper entitled "A Case for Redundant Arrays of Inexpensive Disks (RAID)", Patterson, et al., *Proc. ACM SIGMOD*, June 1988, has catalogued a number of different types of disk arrays by defining five architectures under the acronym "RAID" (for Redundant Arrays of Inexpensive Disks).

A RAID 1 architecture involves providing a duplicate set of "mirror" data storage units and keeping a duplicate copy of all data on each pair of data storage units. A number of implementations of RAID 1 architectures have been made, in particular by Tandem Computers Incorporated.

A RAID 2 architecture stores each bit of each word of data, plus Error Detection and Correction (EDC) bits for each word, on separate disk drives. For example, U.S. Pat. No. 4,722,085 to Flora et al. discloses a disk drive memory using a plurality of relatively small, independently operating disk subsystems to function as a large, high capacity disk drive having an unusually high fault tolerance and a very high data transfer bandwidth. A data organizer adds 7 EDC bits (determined using the well-known Hamming code) to each 32-bit data word to provide error detection and error correction capability. The resultant 39-bit word is written, one bit per disk drive, on to 39 disk drives. If one of the 39 disk drives fails, the remaining 38 bits of each stored 39-bit word can be used to reconstruct each 32-bit data word on a word-by-word basis as each data word is read from the disk drives, thereby obtaining fault tolerance.

A RAID 3 architecture is based on the concept that each disk drive storage unit has internal means for detecting a fault or data error. Therefore, it is not necessary to store extra information to detect the location of an error; a simpler form of parity-based error correction can thus be used. In this approach, the contents of all storage units subject to failure are "Exclusive OR'd" (XOR'd) to generate parity information. The resulting parity information is stored in a single redundant storage unit. If a storage unit fails, the data on that unit can be reconstructed by XOR'ing the data from the remaining storage units with the parity information; if desired, the reconstructed data can be stored on a replacement storage unit. Such an arrangement has the advantage over the mirrored disk RAID 1 architecture in that only one additional storage unit is required for "N" storage units. A further aspect of the RAID 3 architecture is that the disk drives are operated in a coupled manner, similar to a RAID 2 system, and a single disk drive is designated as the parity unit. One implementation of a RAID 3 architecture is the Micropolis Corporation Parallel Drive Array, Model 1804 SCSI, which uses four parallel, synchronized disk drives and one redundant parity drive. The failure of one of the four data disk drives can be remedied by the use of the parity bits stored on the parity disk drive. Another example of a RAID 3 system is described in U.S. Pat. No. 4,092,732 to Ouchi.

A RAID 4 architecture uses the same parity error correction concept of the RAID 3 architecture, but improves on the performance of a RAID 3 system with respect to random reading of small files by "uncoupling" the operation of the individual disk drive actuators, and reading and writing a larger minimum amount of data (typically, a disk sector) to each disk (this is also known as block striping). A further aspect of the RAID 4 architecture is that a single storage unit is designated as the parity unit.

A RAID 5 architecture uses the same parity error correction concept of the RAID 4 architecture and independent actuators, but improves on the writing performance of a RAID 4 system by distributing the data and parity information across all of the available disk drives. Typically, "N+1" storage units in a set (also known as a "redundancy group") are divided into a plurality of equally sized address areas referred to as blocks. Each storage unit generally contains the same number of blocks. Blocks from each storage unit in a redundancy group having the same unit address ranges are referred to as "stripes". Each stripe has N blocks of data, plus one parity block on one storage unit containing parity for the remainder of the stripe. Further stripes each have parity block, the parity blocks being distributed on different storage units. Parity updating activity associated with every modification of data in a redundancy group is therefore distributed over the different storage units. No single unit is burdened with all of the parity update activity. For example, in a RAID 5 system comprising 5 disk drives, the parity information for the first stripe of blocks may be written to the fifth drive; the parity information for the second stripe of blocks may be written to the fourth drive; the parity information for the third stripe of blocks may be written to the third drive; etc. The parity block for succeeding stripes typically "precesses" around the disk drives in a helical pattern (although other patterns may be used). Thus, no single disk drive is used for storing all of the parity information, as in the RAID 4 architecture. An example of a RAID 5 system is described in U.S. Pat. No. 4,761,785 to Clark et al.

As in a RAID 4 system, a limitation of a RAID 5 system is that a change in a data block requires a Read-Modify-Write sequence comprising a minimum of four storage unit input/output (I/O) accesses: two Read and two Write operations. That is, the old parity block and old data block must be read and XOR'd, and the resulting sum must then be XOR'd with the new data. Both the data and the parity blocks then must be rewritten to the disk drives. While the two Read operations may be done in parallel, as can the two Write operations, modification of a block of data in a RAID 4 or a RAID 5 system still takes substantially longer than the same operation on a conventional disk. A conventional disk does not require the preliminary Read operation, and thus does have to wait for the disk drives to rotate back to the previous position in order to perform the Write operation. The rotational latency time alone can amount to about 50% of the time required for a typical data modification operation. Further, two disk storage units are involved for the duration of each data modification operation, limiting the throughput of the system as a whole.

Moreover, in the general case a fifth storage unit I/O access occurs: to generate a new data block in the first place, most often an old data block is Read, then modified within the CPU to generate a new data block. However, the storage unit controller must re-read the old data block again in order to compute the new parity block. Only in the case of completely generating a new data block in the CPU and writing such new data over an old data block is this fifth I/O access avoided.

Despite the Write performance penalty of RAID 5-type systems, such systems have become increasingly popular, since they provide high data reliability with a low overhead cost for redundancy, good Read performance, and fair Write performance. However, it would be desirable if the performance of such redundant array data storage subsystems could be improved. In particular, a need exists for providing improved performance in RAID 5 storage subsystems by minimizing the number of storage unit accesses required in such systems.

The present invention provides a solution to these problems.

SUMMARY OF THE INVENTION

The present invention provides an apparatus and method for improving the input/output performance of a redundant storage array system. In particular, the present invention provides a "special parity" cache within the controller for a redundant storage array system, and means for determining and caching a quantity known as the "remaining redundancy row parity" (RRR-parity) block. An RRR-parity block is equal to the old parity (OP) block of a redundancy row XOR'd with an old data (OD) block being read from the same redundancy row. (Note that the OD block need not contain useful data, but only refers to a bit-pattern that was used in calculating the parity block for a redundancy row). By caching RRR-parity blocks, Write-intensive storage unit operations can be reduced by up to three input/output (I/O) accesses.

In the preferred embodiment of the invention, upon Reading an OD block, the parity cache is checked for a corresponding RRR-parity block. Two cases exist:

(1) If there is a cache "miss", the OP block corresponding to the OD block is also Read, and the associated RRR-parity block is computed and cached. Thus, a total of two storage unit I/O accesses are required to Read a previously unaccessed OD block and generate the associated RRR-parity.

(2) If there is a cache "hit", the RRR-parity block associated with the desired OD block is already cached, so only the OD block need be Read again. Thus, a total of one storage unit I/O access is required to Read a previously accessed OD block. (In either case, the transfer of the OD block to the CPU is carried out independently of the cache checking and any necessary Read of a corresponding OP block).

When modifying data on the storage devices using the preferred embodiment of the present invention, three cases arise: an old data block is to be modified to create a new data (ND) block; an ND block is generated in the CPU that is not based upon an OD block, but the ND block is to be written over an OD block; or a previously written data block in CPU is again modified, and is to be written over the corresponding recently written data block.

In the first case, the CPU Reads an OD block from the storage units and modifies the data to create an ND block. When Writing the ND block, the parity cache is checked for a corresponding RRR-parity block. Two subcases exist:

(1) If there is a cache miss, the OD block to be overwritten is Read, along with the corresponding OP block. The OP block and OD block are XOR'd to generate an associated RRR-parity block, which is stored in the cache. A new parity (NP) block is then generated by XOR'ing the RRR-parity block with the ND block. The NP block and the ND block are then Written to the storage units. Thus, a total of four additional (over the number I/O accesses needed for the original Read operation) storage unit I/O accesses are required to Write an ND block that is based upon an OD block if there is a cache miss.

(2) If there is a cache hit, meaning that the OD block to be overwritten has at some point in time been Read and has an associated RRR-parity block already, then the OD block and OP block need not be Read again. Instead, the ND block is XOR'd with the associated RRR-parity block to create an NP block. The NP block and the ND block are then Written to the storage units. Thus, a total of two additional storage unit I/O accesses are required to Write an ND block that is based upon an OD block if there is a cache hit.

In the second case, the CPU generates an ND block that is to overwrite an OD block. Since the CPU generates the ND block itself, no storage unit I/O accesses were required to read the OD block and transmit it to the CPU. When writing the ND block, the parity cache is checked for a corresponding RRR-parity block. Two subcases exist:

(1) If there is a cache miss, the OD block to be overwritten is Read, along with the corresponding OP block. The OP block and OD block are XOR'd to generate an associated RRR-parity block, which is stored in the cache. An NP block is generated by XOR'ing the RRR-parity block with the ND block. The NP block and the ND block are then Written to the storage units. Thus, a total of four storage unit I/O accesses are required to Write a CPU-generated ND block that is not based upon an OD block if there is a cache miss.

(2) If there is cache hit, meaning that the OD block to be overwritten has been recently Read and has an associated RRR-parity block already cached, then the OD block and OP block need not be Read again. Instead, the ND block is XOR'd with the associated RRR-parity block to create an NP block. The NP block and the ND block are then Written to the storage units. Thus, a total of two additional storage unit I/O accesses are required to initially Write a CPU-generated ND block that is not based upon an OD block if there is a cache hit.

The third case is a continuation of the cache-hit sub-cases of the first two cases. That is, if an ND block is further modified by the CPU to generate an ND' block, and a cache hit again occurs during a Write operation, the associated RRR-parity block is XOR'd with the ND' block to create a new parity block NP', and the ND' block and NP' block are written to the storage units. Thus, a total of two additional storage unit I/O accesses are required to Modify-Write a recently-written ND block.

In a second embodiment of the invention, generation of each RRR-parity block is not done on every Read of an OD block on which there is a cache miss. Instead, an RRR-parity block is generated only after a cache miss on a Write cycle. This eliminates I/O accesses to the parity storage unit of a redundancy row for every Read, as required by the first embodiment.

The details of the preferred embodiments of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the drawings refer to like elements.

DETAILED DESCRIPTION OF THE INVENTION

Throughout this description, the preferred embodiment and examples shown should be considered as exemplars, rather than limitations on the method of the present invention.

BACKGROUND INFORMATION

Figure 1:
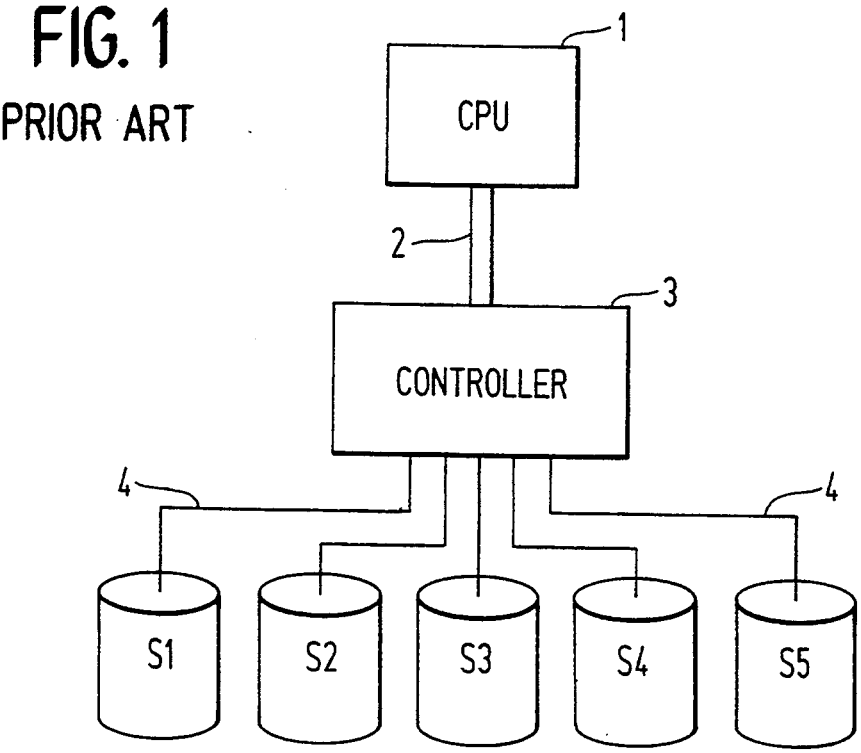
FIG. 1 is block diagram of a generalized prior art RAID system.

FIG. 1 is block diagram of a generalized prior art RAID system. Shown are a CPU 1 coupled by an input/output (I/O) bus 2 to an array controller 3. The array controller 3 is coupled to each of the plurality of storage units S1–S5 (five being shown by way of example only) by one or more device busses (e.g., a SCSI bus) 4. The array controller 3 preferably includes a separately programmable, multi-tasking processor (for example, the MIPS R3000 RISC processor, made by MIPS Corporation of Sunnyvale, Calif.) which can act independently of the CPU 1 to control the storage units S1–S5.

The storage units S1–S5 can be divided and grouped into one or more redundancy groups in a wide variety of ways. However, for simplicity of explanation, in the illustrated examples described below a single redundancy group is used comprising all of the storage units S1–S5.

As is known in the art, each of the storage units S1–S5 comprises a plurality of blocks for storing data or redundancy information. In the most common implementation of such a redundant storage array, the redundancy information is simply the XOR sum of all of the data blocks in a "redundancy row", or "stripe", which comprises corresponding blocks spanning across a redundancy group (here, all of the storage units S1–S5). Thus, in a RAID 4 architecture, where all redundancy information is stored on one storage unit (e.g., S5), if each of the storage units S1–S5 comprises 200 blocks B1–B200, with each redundancy row having a "depth" of one block, then the redundancy or parity block P for each row n is computed (and stored on S5) as follows:

$$P_n = S1_n \oplus S2_n \oplus S3_n \oplus S4_n$$

As is also known, if any of the storage units S1–S4 fails, all of the data blocks on the failed unit can be re-computed from the corresponding data and parity blocks on the other units XOR summing such blocks. For example, if storage unit S1 fails, then the data that was on S1 can be recomputed on a block-by-block basis as follows:

$$S1\ \text{Data}_n = P_n \oplus S2_n \oplus S3_n \oplus S4_n$$

Structure of the Preferred Embodiment

Figure 2:
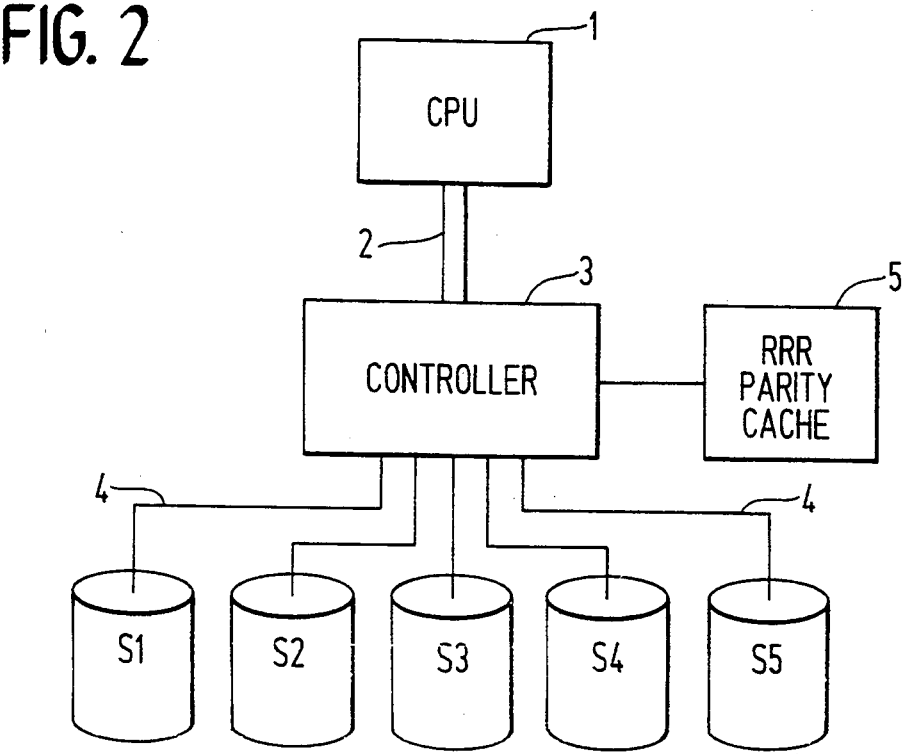
FIG. 2 is a block diagram of a parity caching array controller in accordance with the present invention.

FIG. 2 is a block diagram of the preferred embodiment of the present invention. The diagram is similar to the prior art shown in FIG. 1, but further includes an "RRR-parity cache" 5 coupled to the array controller 3. (Although the RRR-parity cache 5 is shown as a separate element from the array controller 3, the RRR-parity cache 5 may be included as part of the circuitry of the array controller 3).

A cache is generally a small amount of fast, solid-state random access memory ("RAM") that holds the same information as some part of a slower data storage unit (in this case, a peripheral data storage unit) so that the information can be obtained quickly from the cache when it is needed, rather than from the slower storage medium. Generally, when a processor issues a Read request to a peripheral data storage unit, a cache is first checked to determine if the addressed data is present and valid. If so, the data is supplied to the processor from the cache (a cache "hit"); if not (a cache "miss"), the data is Read from the peripheral data storage device, and supplied to the processor. In addition, the newly Read data is stored in the cache for future access. If enough free space is unavailable in the cache, the newly read data over-writes older data in the cache.

In the present invention, the RRR-parity cache 5 is not used for simply caching data Read from a storage unit. Instead, the RRR-parity cache 5 is used to cache specially computed information derived from the contents of the storage units S1–S5. In particular, the RRR-parity cache 5 stores a quantity known as the "remaining redundancy row parity" (RRR-parity) block. An RRR-parity block is equal to the existing or "old" parity (OP) block of a redundancy row XOR'd with an existing or "old" data (OD) block being read from the same redundancy row:

$$RRR\text{-parity}_n = OP_n \oplus OD_n$$

It should be noted that the OD block need not contain useful data, but only refers to a bit-pattern that was used in calculating the parity block for a redundancy row.

Thus, for example, when a storage unit is first initialized, each data storage area may contain a specialized or random bit-pattern. Regardless of the contents of each data block, a redundancy block must be computed from the actual contents of all of the data blocks in a redundancy row.

The RRR-parity cache 5 may be implemented in any number of known ways, from a physically separate cache unit to a reserved portion of memory in the array controller 3, and with either dedicated hardware for addressing and controlling the cache or a computer program executed within the array controller 3 as a task. Further, the caching algorithm used in conjunction with the RRR-parity cache 5 may be any one of several known algorithms for purging data within the cache, including the well-known "Least Recently Used" algorithm, which keeps track of the frequency of use of the information stored within the cache and purges the least recently used information when the cache is out of storage space.

In the preferred embodiment, the RRR-parity cache 5 is coupled to the array controller 3 such that the array controller 3 can compute RRR-parity blocks and store such blocks in the RRR-parity cache 5. Similarly, the array controller 3 is configured such that a Read request for a particular data block on any of the storage units S1–S5 causes the array controller 3 to address the RRR-parity cache 5 to determine if a previous Read or Write of that data block has caused a corresponding RRR-parity block to be computed and stored in the RRR-parity cache 5. It is well-known in the art how to access and check a cache for such purposes.

The array controller 3 takes different courses of action with respect to I/O accesses of the storage units S1–S5 depending upon whether a cache "hit" or a cache "miss" in the RRR-parity cache 5 occurs.

Prior Art Method

Figure 3:
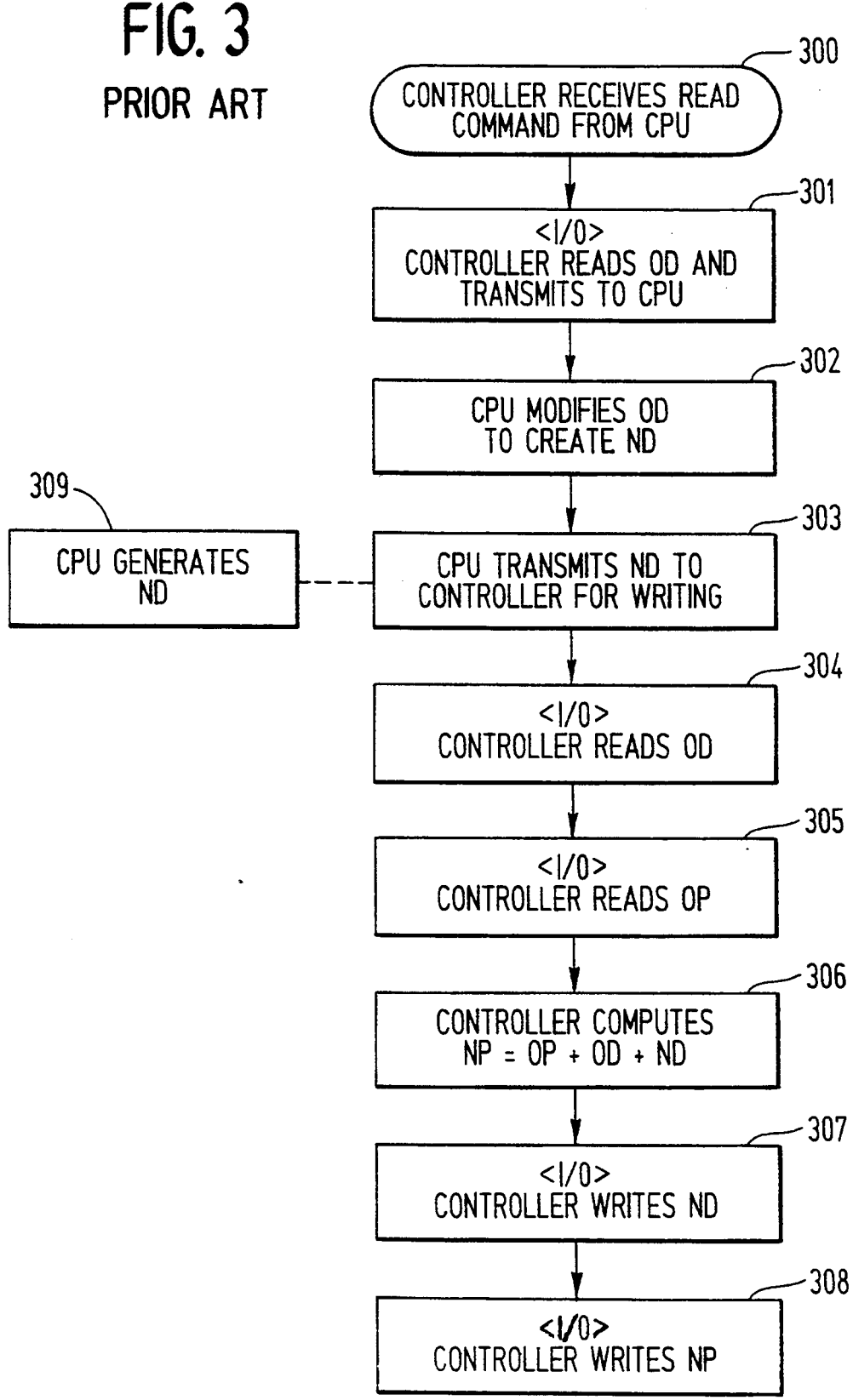
FIG. 3 is a high-level flowchart showing the prior art method of Reading from and Writing to a RAID system.

To better illustrate the differences between the prior art and the present invention, FIG. 3 sets forth a high-level flowchart showing the prior art method of Reading from and Writing to a RAID system. The steps shown in FIG. 3 are referenced below.

As shown in FIG. 3, there are two pathways which can occur that result in data blocks being written to the storage units S1–S5. In the first path, the array controller 3 receives a Read command from the CPU 1 (step 300). The array controller 3 then generates an address for a requested OD block, Reads the OD block from one or more of the storage units S1–S5, and transmits the read OD block to the CPU 1 (step 301).

The CPU 1 then may modify the data of the OD block in accordance with the user's application program. If the OD block is modified, it is thereby transformed into an updated or "new" data (ND) block (step 302). Thereafter, the CPU 1 transmits the ND block to the array controller 3 for Writing to the storage units S1–S5 (step 303).

In order to preserve the RAID properties of the storage units S1–S5, the array controller 3 again Reads each OD block to be Written over by a corresponding ND block (step 304), and each corresponding OP block in the same redundancy row (step 305). The array controller 3 then computes an updated or "new" parity (NP) block as the XOR sum of the OP block, the OD block, and ND block, as follows (step 306):

$$NP_n = OP_n \oplus OD_n \oplus ND_n$$

Finally, the array controller 3 Writes the ND block to the appropriate location on the storage units S1–S5 (step 307) and the newly computed NP block to the appropriate location on the storage unit containing the redundancy information for the corresponding redundancy row (step 308).

Although the Reading of the OD block and OP block (steps 304 and 305), and the Writing of the ND block and NP block (steps 307 and 308) are shown as sequential in FIG. 3, these steps may be carried out concurrently, in known fashion, since the blocks involved would be on separate storage units, which can act independently of each other. (Of course, the Reads must precede the Writes).

An alternative mode of operation occurs when the CPU 1 generates an ND block independently of existing OD blocks stored within the storage units S1–S5. For example, the CPU 1 may be receiving data transmitted from a backup tape or other device, or generating information based upon direct user input that does not require prior access to data stored within the storage units S1–S5. Consequently, the operational path differs somewhat from the steps described above. Again referring to FIG. 3, after the CPU 1 generates the "independent" ND block (step 309), the CPU 1 transmits the ND block to the array controller 3 for Writing (step 303). Thereafter, the remaining steps of accessing the OD block to be overwritten by the ND block (step 304), accessing the corresponding OP block (step 305), computing the NP block (step 306), and Writing the ND block and NP block (steps 307 and 308), remain the same.

As examination of FIG. 3 discloses, in the case of a prior Read of an OD block which is later modified by the CPU 1 to create an ND block, a total of five I/O accesses of the storage units S1–S5 are required to write out the ND block and maintain the redundancy characteristics of the array system (note in FIG. 3 that the I/O accesses are specially marked by the symbol "<I/O>"). In the case of generation in the CPU 1 of ND blocks independent of OD blocks, four I/O accesses are required to store the ND blocks and update the redundancy information on the storage units S1–S5.

First Embodiment of the Invention

Figure 4:
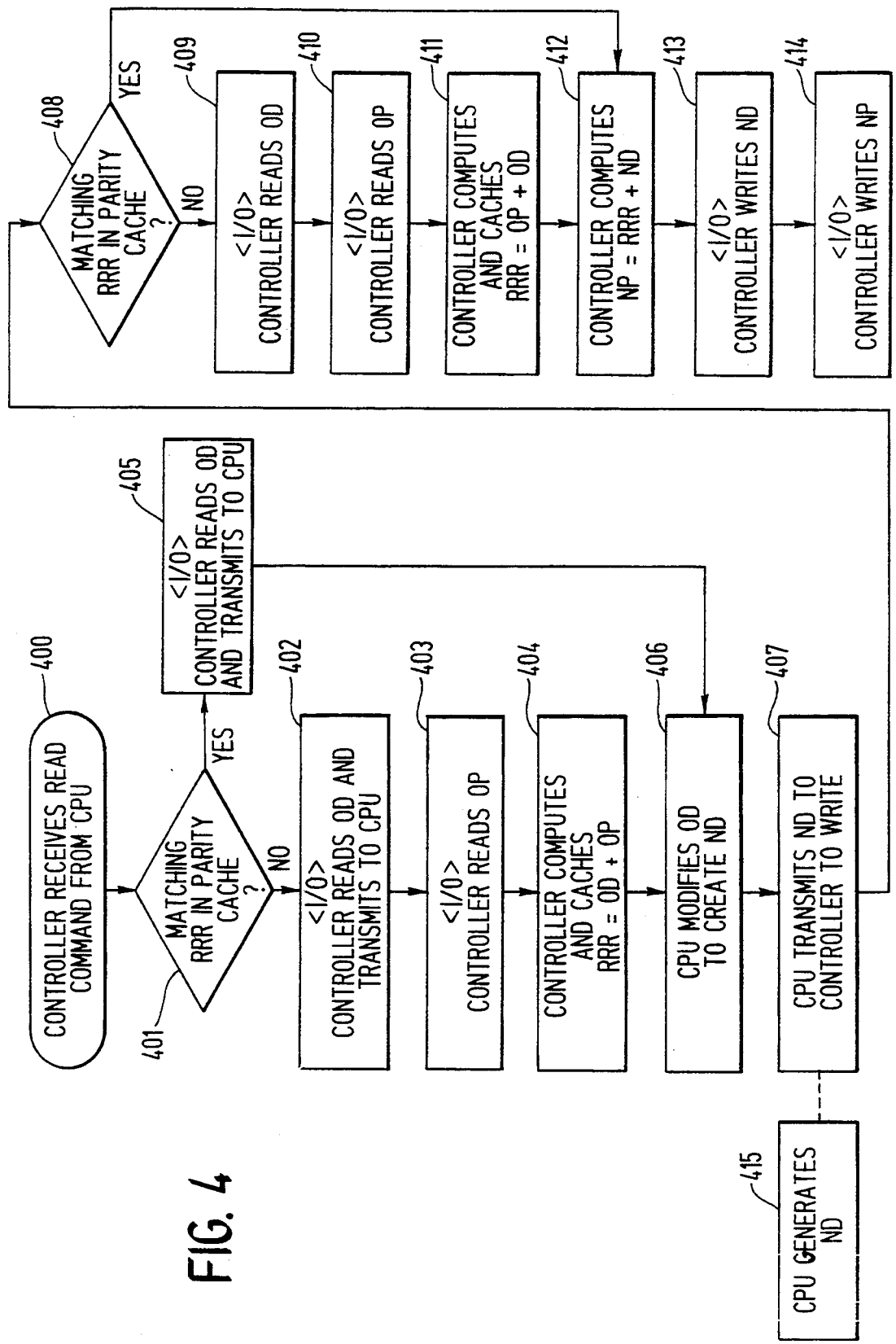
FIG. 4 is a high-level flowchart showing a first method of Reading from and Writing to a RAID system using the present invention.

FIG. 4 is a high-level flow chart showing a first method of Reading from and Writing to a RAID system using the present invention. The steps shown in FIG. 4 are referenced below.

In a fashion similar to the prior art method shown in FIG. 3, in a first mode of operation the array controller 3 receives a Read command from the CPU 1 (step 400). The array controller 3 then addresses the RRR-parity cache 5 to determine if an RRR-parity block corresponding to the requested data is contained within the cache (step 401). If not (a cache miss), the array controller 3 Reads the requested OD block from the relevant storage unit S1–S5, and transmits the OD block to the CPU 1 (step 402). The array controller 3 then continues operation and Reads the OP block from the same redundancy row as the requested OD block (step 403). The array controller 3 then computes the RRR-parity block for that redundancy row, using the equation RRR-parity$_n$ = $OP_n \oplus OD_n$, and stores (or "caches") the computed RRR-parity block in the RRR-parity cache 5 (step 404).

If, on the other hand, the array controller 3 determines (step 401) that a matching RRR-parity block is in the RRR-parity cache 5 (a cache hit), the array controller 3 simply Reads the requested OD block and transmits it to the CPU 1 (step 405). The significance of the cache hit is that an RRR-parity block corresponding to the requested OD block has already been cached. Therefore, only the OD block need be Read again.

In either case, the transfer of the OD block to the CPU 1 is carried out independently of the cache checking by the array controller 3, and of any necessary Read of a corresponding OP block for purposes of computing an RRR-parity block. Note that in implementing the invention, the operation of Reading and transmitting the OD block to the CPU 1 in Step 402 or Step 405 can be done before or in parallel with the decision made in Step 401, since performance would be enhanced by transferring the OD block to the CPU 1 as soon as possible.

After the requested OD block has been received by the CPU 1, the CPU 1 may modify the OD block to create an ND block (step 406). If the ND block is to be stored, the CPU 1 transmits the ND block to the array controller 3 to be Written to the storage units S1-S5 (step 407). In response to a Write command, the array controller 3 checks the RRR-parity cache 5 to determine if the received ND block has a corresponding RRR-parity block within the cache (step 408). That is, the array controller 3 addresses the RRR-parity cache 5 to determine if the redundancy row data block location at which the ND block will be written had previously been accessed, and an associated RRR-parity block computed and cached. If not (a cache miss), the array controller 3 reads the OD block from the data block address to be overwritten by the ND block (step 409), and Reads the corresponding OP block from the same redundancy row (step 410). The array controller 3 then computes and caches a new RRR-parity block from the OD block and OP block, using any known caching algorithm (step 411). The array controller 3 also computes an NP block as the XOR sum of the RRR-parity block and the ND block (or, alternatively, as the XOR sum of the OP block, the OD block, and the ND block) (step 412). The array controller 3 then Writes out the ND block (step 413) and the NP block (step 414) to the appropriate locations on the storage units S1-S5.

If an RRR-parity block corresponding to the ND block to be Written is found (a cache hit) in the RRR-parity cache 5 (step 408), the array controller 3 need only compute an NP block from the cached RRR-parity block and the ND block (step 412), and Write out the ND block (step 413) and NP block (step 414) to complete the update operation.

Similar to the prior art, an alternative pathway exists when the CPU 1 generates an ND block independently of existing OD blocks (step 415). Such ND blocks are transmitted by the CPU 1 to the array controller 3 to Write to the storage units S1-S5 (step 407). The remaining operations of testing the RRR-parity cache (step 408) and proceeding accordingly through step sequences 409-414 or 412-414, are as described above.

It should be noted that it is possible for a cache miss to occur (step 401) during an initial Read of an OD block, and a subsequent cache miss to occur (step 408) during the Writing of an ND block based upon that OD block, despite the generation of an RRR-parity block (step 404). This is because the associated RRR-parity block can be purged from the RRR-parity cache 5 due to intervening I/O accesses to other data blocks before the Write operation for the ND block commences.

As should be clear from an examination of the I/O accesses in the various possible paths shown in FIG. 4, in many cases the number of I/O accesses will be substantially lower than the prior art, which teaches 4 I/O accesses for "Read-Modify-Write" operations, and 5 I/O accesses for "Initial Read-Read-Modify-Write" operations. All of the pathways may be characterized in "shorthand" fashion as follows:

(1) Initial Read after cache miss and Write after cache hit (step sequence 401-404, 406-408, 412-414)—4 I/O accesses (one better than the prior art);
(2) Initial Read after cache miss and Write after cache miss (step sequence 401-404, 406-414)—6 I/O accesses (one worse than the prior art);
(3) Initial Read after cache hit and Write after cache hit (step sequence 401, 40514 408, 412-414)—3 I/O accesses (two better than the prior art);
(4) Initial Read after cache hit and Write after cache miss (step sequence 401, 405-414)—5 I/O accesses (same as the prior art);
(5) ND block generation without initial Read, and Write after cache hit (step sequence 415, 407-408, 412-414)—2 I/O accesses (two better than the prior art);
(6) ND block generation without initial Read, and Write after cache miss (step sequence 415, 407-414)—4 I/O accesses (same as the prior art).

Thus, of the six possible types of operational sequences, three have fewer I/O accesses than the corresponding operations in the prior art, two have the same number of I/O accesses as the corresponding operations in the prior art, and one has one more I/O access than the corresponding operation in the prior art.

In the worst case, a Read operation of an OD block with no corresponding RRR-parity block will require two I/O accesses (steps 402 and 403), and thereafter, that RRR-parity block will be purged from the RRR-parity cache 5 before a Write operation relating to the OD block occurs. Such a purge would necessitate a re-Read of the OD block and OP block (steps 409 and 410), followed by a Write of the ND block and the NP block (steps 413 and 414), for a total of six I/O accesses.

However, in the more normal cases, an OD block and OP block will be initially Read and an RRR-parity block calculated and cached (steps 402-404), for two I/O accesses. Thereafter, if an ND block derived from the OD block is Written before a purge of the corresponding RRR-parity block from the RRR-parity cache 5 occurs, the ND block and NP block can be Written with only two additional I/O accesses, for a total of four I/O accesses. Even more significantly, if the same data block in the CPU 1 is again changed, the pathway for that ND block (ND') starts at step 415. Again, if the ND' block is Written before a purge of the corresponding RRR-parity block from the RRR-parity cache 5 occurs, the ND' block and associated NP block can be Written with only two additional I/O accesses, for a total of two I/O accesses attributable to Writing the ND' block. Additional changes to data blocks that have been Written previously and which have corresponding RRR-parity blocks within the RRR-parity cache 5 require only two I/O accesses to complete. In certain types of transactions, such repetitive changes to the same data blocks occur frequently, thus increasing the number of transactions requiring a lower number of I/O accesses in comparison to the prior art.

Second Embodiment of the Invention

Figure 5:
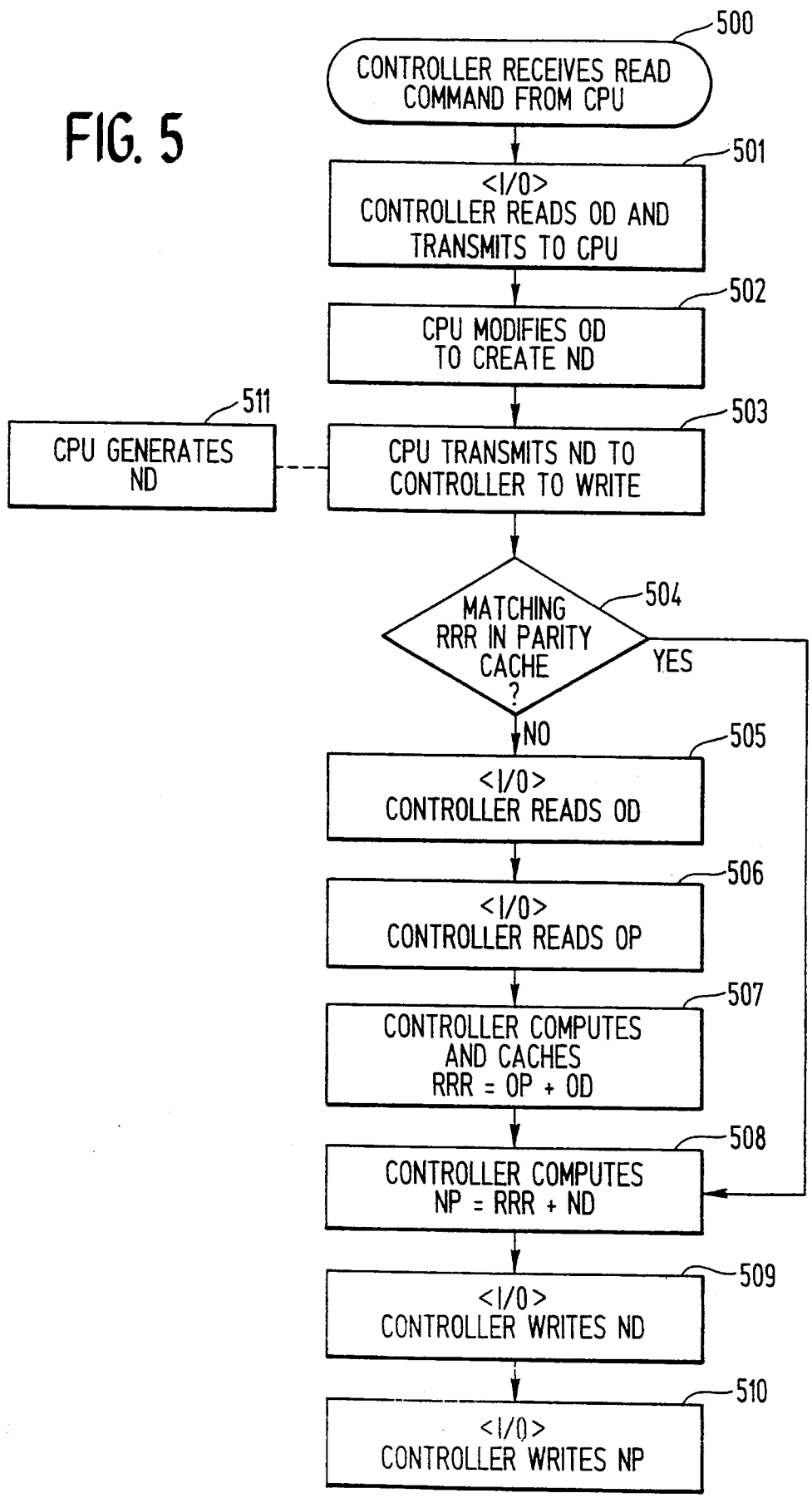
FIG. 5 is a high-level flowchart showing a second method of Reading from and Writing to a RAID system using the present invention.

FIG. 5 is a high-level flow chart showing a second method of Reading from and Writing to a RAID system using the present invention. The steps shown in FIG. 5 are referenced below.

In a fashion similar to the method shown in FIG. 4, in a first mode of operation the array controller 3 receives a Read command from the CPU 1 (step 500). The array controller 3 immediately Reads the requested OD block and transmits it to the CPU 1 (step 501).

After the requested OD block has been received by the CPU 1, the CPU 1 may modify the OD block to create an ND block (step 502). If the ND block is to be stored, the CPU 1 transmits the ND block to the array controller 3 to be Written to the storage units S1–S5 (step 503). In response to a Write command, the array controller 3 checks the RRR-parity cache 5 to determine if the received ND block has a corresponding RRR-parity block within the cache (step 504). That is, the array controller 3 addresses the RRR-parity cache 5 to determine if the redundancy row data block location at which the ND block will be written had previously been accessed, and an associated RRR-parity block computed and cached. If not (a cache miss), the array controller 3 reads the OD block from the data block address to be overwritten by the ND block (step 505), and Reads the corresponding OP block from the same redundancy row (step 506). The array controller 3 then computes and caches a new RRR-parity block from the OD block and OP block, using any known caching algorithm (step 507). The array controller 3 also computes an NP block as the XOR sum of the RRR-parity block and the ND block (or, alternatively, as the XOR sum of the OP block, the OD block, and the ND block) (step 508). The array controller 3 then Writes out the ND block (step 509) and the NP block (step 510) to the appropriate locations on the storage units S1–S5.

If an RRR-parity block corresponding to the ND block to be written is found (a cache hit) in the RRR-parity cache 5 (step 504), the array controller 3 need cache hit) in the RRR-parity cache 5 (step 504), the array controller 3 need only compute an NP block from the cached RRR-parity block and the ND block (step 508), and Write out the ND block (step 509) and NP block (step 510) to complete the updata operation.

Similar to the first embodiment described above, an alternative pathway exists when the CPU 1 generates an ND block independently of existing OD blocks (step 511). Such ND blocks are transmitted by the CPU 1 to the array controller 3 to Write to the storage units S1–S5 (step 503). The remaining operations of testing the RRR-parity cache (step 504) and proceeding accordingly through step sequences 505–510 or 508–510, are as described above.

In this second embodiment of the invention, generation of each RRR-parity block is not done on every Read of an OD block on which there is a cache miss. Instead, an RRR-parity block is generated only after a cache miss on a Write cycle. This eliminates I/O accesses to the parity storage unit of a redundancy row for every Read. In some applications, the overall number of I/O accesses may be less with this embodiment of the invention compared with the first embodiment described above.

As should be clear from an examination of the I/O accesses in the various possible paths shown in FIG. 5, in many cases the number of I/O accesses will be substantially lower than the prior art, which teaches 4 I/O accesses for "Read-Modify-Write" operations, and 5 I/O accesses for "Initial Read-Read-Modify-Write" operations. All of the pathway may be characterized in "shorthand" fashion as follows:

(1) Initial Read and Write after cache hit (step sequence 501–504, 508–510)—3 I/O accesses (two better than the prior art);
(2) Initial Read and Write after cache miss (step sequence 501–510)—5 I/O accesses (same as the prior art);
(3) ND block generation without initial Read, and Write after cache hit (step sequence 511, 503–504, 508–510)—2 I/O accesses (two better than the prior art);
(4) ND block generation without initial Read, and Write after cache miss (step sequence 511, 503–510)—4 I/O accesses (same as the prior art).

Thus, of the four possible types of operational sequences, two have fewer I/O accesses than the corresponding operations in the prior art, and two have the same number of I/O accesses as the corresponding operations in the prior art.

Summary

The present invention provides an apparatus and method for improving the input/output performance of a redundant storage array system. In particular, the present invention provides a special "remaining redundancy row parity" cache for a redundant storage array system, and means for determining and caching RRR-parity blocks. The invention may provide even greater savings of I/O access operations than indicated by the tables given above where large numbers of blocks are Read, followed by Write operations with respect to some of such blocks. By caching RRR-parity blocks, Write-intensive storage unit operations can be reduced by up to three input/output (I/O) accesses compared to the prior art.

A number of embodiments of the present invention have been described. Nevertheless, it will be understood that various modifications may be made without departing from the spirit and scope of the invention. For example, the present invention can be used with RAID 3, RAID 4, or RAID 5 systems. Furthermore, an error-correction method in addition to or in lieu of the XOR-generated parity may be used for the necessary redundancy information. One such method using Reed-Solomon codes is disclosed in U.S. patent application Ser. No. 270,713, filed Nov. 14, 1988, entitled "Arrayed Disk Drive System and Method" and assigned to the assignee of the present invention. With the structure and method taught by that reference, the present invention can accommodate the loss of two storage units if both XOR and Reed-Solomon (or any other system) redundancy are used. Further, although a particular sequence of steps is shown in FIGS. 4 and 5, other equivalent sequences are possible to accomplish the same functions. For example, in FIG. 4, the step of Reading the OD block (step 402 or 405) may precede checking the RRR-parity cache 5 for a corresponding RRR-parity block. Accordingly, it is to be understood that the invention is not to be limited by the specific illustrated embodiment, but only by the scope of the appended claims.

I claim:

1. A redundant storage array system including:

a. a plurality of failure independent data storage units for storing data and redundancy information in the form of blocks;
b. caching means for temporarily storing remaining redundancy row parity (RRR-parity) blocks derived from the plurality of data storage units;
c. storage unit controller means, coupled to the plurality of data storage units and to the caching means, for:
   (1) controlling reading data and redundancy blocks from, and writing data and redundancy blocks to, the plurality of data storage units;
   (2) computing RRR-parity blocks derived from the plurality of data storage units; and
   (3) caching the computed RRR-parity blocks in the caching means.

2. The apparatus of claim 1, wherein the storage unit controller means further includes means for determining if an RRR-parity block corresponding to a data block is stored in the caching means.

3. The apparatus of claim 1, wherein each RRR-parity block is computed by exclusively-OR'ing:
a. a data block read from at least one data storage unit, and
b. a corresponding redundancy block read from at least one data storage unit.

4. A redundant storage array system including:
a. a plurality of failure independent data storage units for storing data and redundancy information in the form of blocks;
b. caching means for temporarily storing remaining redundancy row parity (RRR-parity) blocks derived from the plurality of data storage units;
c. a storage unit controller means, coupled to the plurality of data storage units and to the caching means, for:
   (1) receiving from a processor at least one command to read an old data block from at least one data storage unit;
   (2) reading the old data block from at least one data storage unit;
   (3) communicating with the caching means to determine if an RRR-parity block corresponding to the previously read old data block is stored therein, and if such a corresponding RRR-parity block is not stored within the caching means, then:
      (a) reading an old redundancy block, corresponding to the read data block, from at least one data storage unit;
      (b) computing an RRR-parity block from the read data block and the corresponding read redundancy block;
      (c) caching the computed RRR-parity block in the caching means.

5. The apparatus of claim 4, wherein an RRR-parity block is computed by exclusively-OR'ing a read data block and a corresponding read redundancy block.

6. A redundant storage array system including:
a. a plurality of failure independent data storage units for storing data and redundancy information in the form of blocks;
b. caching means for temporarily storing remaining redundancy row parity (RRR-parity) blocks derived from the plurality of data storage units;
c. a storage unit controller, coupled to the plurality of data storage units and to the caching means, comprising control means for modifying a data block including means for:
   (1) receiving a new data block from a processor;
   (2) communicating with the caching means to retrieve an RRR-parity block stored therein corresponding to the received new data block, and if such a corresponding RRR-parity block is not stored within the caching means, then:
      (a) reading an old data block, corresponding to the new data block, from at least one data storage unit;
      (b) reading an old redundancy block, corresponding to the new data block, from at least one data storage unit;
      (c) computing an RRR-parity block, corresponding to the new data block, from the previously read old data block and the corresponding read redundancy block;
      (d) caching the computed RRR-parity block in the caching means;
   (3) generating a new redundancy block from the new data block and the RRR-parity block corresponding to the new data block;
   (4) writing the new redundancy block to at least one data storage unit;
   (5) writing the new data block over the previously read old data block.

7. The apparatus of claim 6, wherein an RRR-parity block is computed by exclusively-OR'ing a read data block and a corresponding read redundancy block.

8. The apparatus of claim 6, wherein a redundancy block is computed by exclusively-OR'ing a read data block, a corresponding read redundancy block, and a new data block.

9. A redundant storage array system including:
a. a plurality of failure independent data storage units for storing data and redundancy information in the form of blocks;
b. caching means for temporarily storing remaining redundancy row parity (RRR-parity) blocks derived from the plurality of data storage units;
c. a storage unit controller, coupled to the plurality of data storage units and to the caching means, comprising control means for modifying a data block including means for:
   (1) receiving from a processor at least one command to read an old data block from at least one data storage unit;
   (2) reading the old data block from at least one data storage unit;
   (3) communicating with the caching means to determine if an RRR-parity block corresponding to the previously read old data block is stored therein, and if such a corresponding RRR-parity block is not stored within the caching means, then:
      (a) reading an old redundancy block, corresponding to the read data block, from at least one data storage unit;
      (b) computing an RRR-parity block from the read data block and the corresponding read redundancy block;
      (c) caching the computed RRR-parity block in the caching means;
   (4) transmitting the read data block to the processor;
   (5) receiving a new data block from the processor;

(6) communicating with the caching means to retrieve an RRR-parity block stored therein corresponding to the received new data block, and if such a corresponding RRR-parity block is not stored within the caching means, then:
  (a) reading an old data block, corresponding to the new data block, from at least one data storage unit;
  (b) reading an old redundancy block, corresponding to the new data block, from at least one data storage unit;
  (c) computing an RRR-parity block, corresponding to the new data block, from the previously read old data block and the corresponding read redundancy block;
  (d) caching the computed RRR-parity block in the caching means;
(7) generating a new redundancy block from the new data block and the RRR-parity block corresponding to the new data block;
(8) writing the new redundancy block to at least one data storage unit;
(9) writing the new data block over the previously read old data block.

10. The apparatus of claim 9, wherein an RRR-parity block is computed by exclusively-OR'ing a read data block and a corresponding read redundancy block.

11. The apparatus of claim 9, wherein a redundancy block is computed by exclusively-OR'ing a read data block, a corresponding read redundancy block, and a new data block.

12. A redundant storage array system including:
  a. a plurality of failure independent data storage units for storing data and redundancy information in the form of blocks;
  b. caching means for temporarily storing remaining redundancy row parity (RRR-parity) blocks derived from the plurality of data storage units;
  c. a storage unit controller, coupled to the plurality of data storage units and to the caching means, comprising control means for modifying a data block including means for:
    (1) receiving from a processor at least one command to read an old data block from at least one data storage unit;
    (2) reading the old data block from at least one data storage unit;
    (3) transmitting the read data block to the processor;
    (4) receiving a new data block from the processor;
    (5) communicating with the caching means to retrieve an RRR-parity block stored therein corresponding to the received new data block, and if such a corresponding RRR-parity block is not stored within the caching means, then:
      (a) reading an old data block, corresponding to the new data block, from at least one data storage unit;
      (b) reading an old redundancy block, corresponding to the new data block, from at least one data storage unit;
      (c) computing an RRR-parity block, corresponding to the new data block, from the previously read old data block and the corresponding read redundancy block;
      (d) caching the computed RRR-parity block in the caching means;
    (6) generating a new redundancy block from the new data block and the RRR-parity block corresponding to the new data block;
    (7) writing the new redundancy block to at least one data storage unit;
    (8) writing the new data block over the previously read old data block.

13. The apparatus of claim 12, wherein an RRR-parity block is computed by exclusively-OR'ing a read data block and a corresponding read redundancy block.

14. The apparatus of claim 12, wherein a redundancy block is computed by exclusively-OR'ing a read data block, a corresponding read redundancy block and a new data block.

15. In a redundant storage array system including a controller, a cache coupled to the controller, and a plurality of failure independent data storage units coupled to the controller for storing data and redundancy information in the form of blocks, a method for improving the input/output performance of the redundant storage array system comprising the step of:
  a. caching remaining redundancy row parity (RRR-parity) blocks derived from the plurality of data storage units.

16. The method of claim 15, further including the step of determining if an RRR-parity block corresponding to a data block is stored in the cache.

17. The method of claim 15, wherein each RRR-parity block is computed by exclusively-OR'ing:
  a. a data block read from at least one data storage unit, and
  b. a corresponding redundancy block read from at least one data storage unit.

18. In a redundant storage array system including a controller, a cache coupled to the controller, and a plurality of failure independent data storage units coupled to the controller for storing data and redundancy information in the form of blocks, a method for improving the input/output performance of the redundant storage array system comprising the steps of:
  a. receiving from a processor at least one command to read an old data block from at least one data storage unit;
  b. reading the old data block from at least one data storage unit;
  c. determining if an RRR-parity block corresponding to the previously read old data block is stored within the cache, and if such a corresponding RRR-parity block is not stored within the cache, then:
    (1) reading an old redundancy block, corresponding to the read data block, from at least one data storage unit;
    (2) computing an RRR-parity block from the read data block and the corresponding read redundancy block;
    (3) caching the computed RRR-parity block in the cache.

19. The method of claim 18, wherein an RRR-parity block is computed by exclusively-OR'ing a read data block and corresponding read redundancy block.

20. In a redundant storage array system including a controller, a cache coupled to the controller, and a plurality of failure independent data storage units coupled to the controller for storing data and redundancy information in the form of blocks, a method for improving the input/output performance of the redundant storage array system comprising the steps of:

a. receiving a new data block from a processor;
b. retrieving an RRR-parity block stored in the cache corresponding to the received new data block, and if such a corresponding RRR-parity block is not stored within the cache, then:
   (1) reading an old data block, corresponding to the new data block, from at least one data storage unit;
   (2) reading an old redundancy block, corresponding to the new data block, from at least one data storage unit;
   (3) computing an RRR-parity block, corresponding to the new data block, from the previously read old data block and the corresponding read redundancy block;
   (4) caching the computed RRR-parity block in the cache;
c. generating a new redundancy block from the new data block and the RRR-parity block corresponding to the new data block;
d. writing the new redundancy block to at least one data storage unit;
e. writing the new data block over the previously read old data block.

21. The method of claim 20, wherein an RRR-parity block is computed by exclusively-OR'ing a read data block and a corresponding read redundancy block.

22. The method of claim 20, wherein a redundancy block is computed by exclusively-OR'ing a read data block, a corresponding read redundancy block, and a new data block.

23. In a redundant storage array system including a controller, a cache coupled to the controller, and a plurality of failure independent data storage units coupled to the controller for storing data and redundancy information in the form of blocks, a method for improving the input/output performance of the redundant storage array system comprising the steps of:
   a. receiving from a processor at least one command to read an old data block from at least one data storage unit;
   b. reading the old data block from at least one data storage unit;
   c. determining if an RRR-parity block corresponding to the previously read old data block is stored within the cache, and if such a corresponding RRR-parity block is not stored within the cache, then:
      (1) reading an old redundancy block, corresponding to the read data block, from at least one data storage unit;
      (2) computing an RRR-parity block from the read data block and the corresponding read redundancy block;
      (3) caching the computed RRR-parity block in the cache;
   d. transmitting the read data block to the processor;
   e. receiving a new data block from the processor;
   f. retrieving an RRR-parity block stored in the cache corresponding to the received new data block, and if such a corresponding RRR-parity block is not stored within the cache, then:
      (1) reading an old data block, corresponding to the new data block, from at least one data storage unit;
      (2) reading an old redundancy block, corresponding to the new data block, from at least one data storage unit;
      (3) computing an RRR-parity block, corresponding to the new data block, from the previously read old data block and the corresponding read redundancy block;
      (4) caching the computed RRR-parity block in the cache;
   g. generating a new redundancy block from the new data block and the RRR-parity block corresponding to the new data block;
   h. writing the new redundancy block to at least one data storage unit;
   i. writing the new data block over the previously read old data block.

24. The method of claim 23, wherein an RRR-parity block is computed by exclusively-OR'ing a read data block and a corresponding read redundancy block.

25. The method of claim 23, wherein a redundancy block is computed by exclusively-OR'ing a read data block, a corresponding read redundancy block, and a new data block.

26. In a redundant storage array system including a controller, a cache coupled to the controller, and a plurality of failure independent data storage units coupled to the controller for storing data and redundancy information in the form of blocks, a method for improving the input/output performance of the redundant storage array system comprising the steps of:
   a. receiving from a processor at least one command to read an old data block from at least one data storage unit;
   b. reading the old data block from at least one data storage unit;
   c. transmitting the read data block to the processor;
   d. receiving a new data block from the processor;
   e. retrieving an RRR-parity block stored in the cache corresponding to the received new data block, and if such a corresponding RRR-parity block is not stored within the cache, then:
      (1) reading an old data block, corresponding to the new data block, from at least one data storage unit;
      (2) reading an old redundancy block, corresponding to the new data block, from at least one data storage unit;
      (3) computing an RRR-parity block, corresponding to the new data block, from the previously read old data block and the corresponding read redundancy block;
      (4) caching the computed RRR-parity block in the cache;
   f. generating a new redundancy block from the new data block and the RRR-parity block corresponding to the new data block;
   g. writing the new redundancy block to at least one data storage unit;
   h. writing the new data block over the previously read old data block.

27. The method of claim 26, wherein an RRR-parity block is computed by exclusively-OR'ing a read data block and a corresponding read redundancy block.

28. The method of claim 26, wherein a redundancy block is computed by exclusively-OR'ing a read data block, a corresponding read redundancy block, and a new data block.

* * * * *